(No Model.)
L. RUNYAN.
RIDGING ATTACHMENT FOR CORN PLANTERS.
No. 527,160. Patented Oct. 9, 1894.
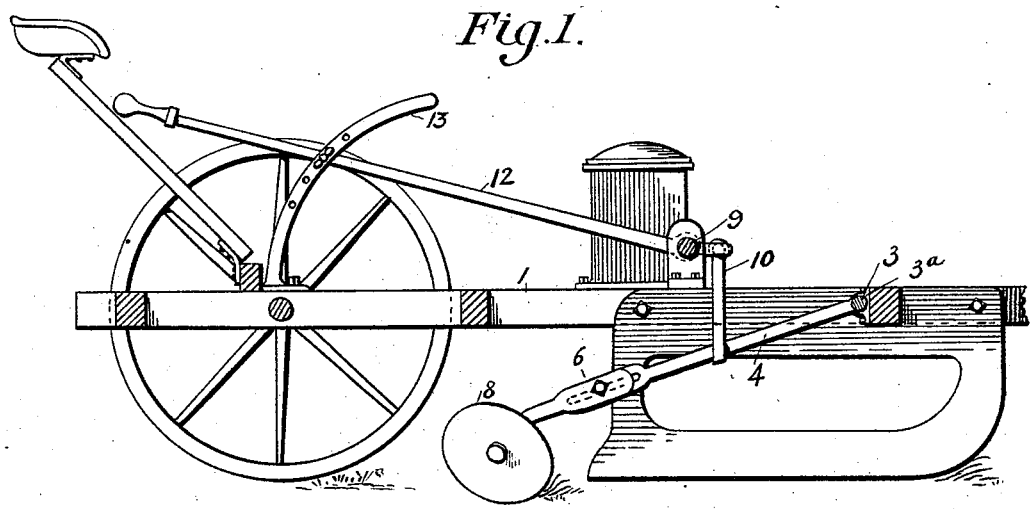
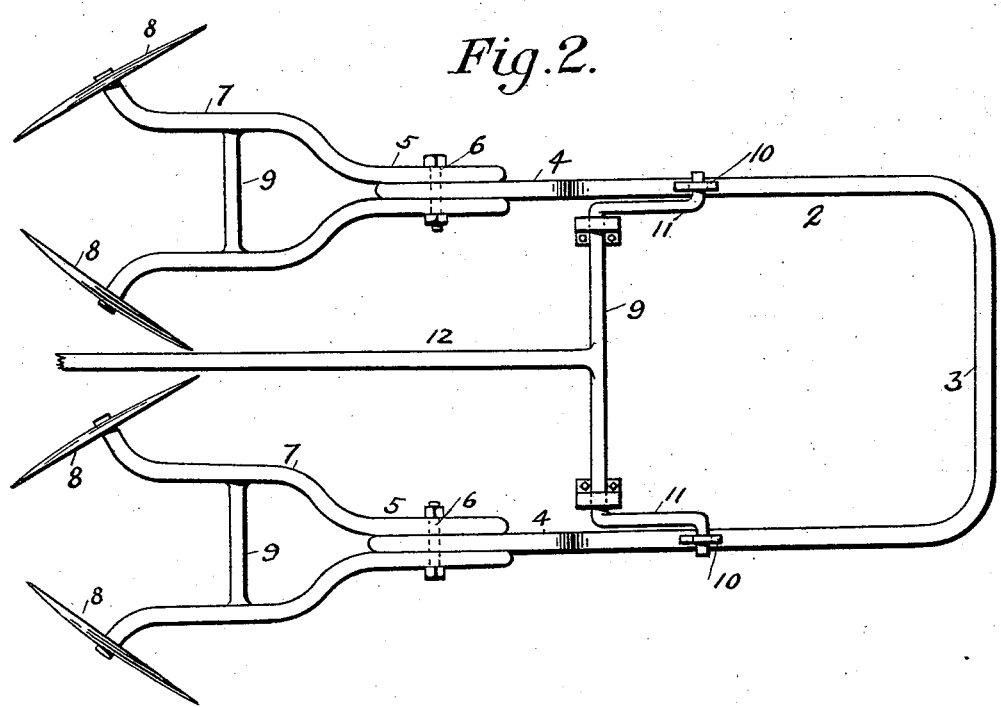

UNITED STATES PATENT OFFICE.

LEROY RUNYAN, OF IOLA, KANSAS.

RIDGING ATTACHMENT FOR CORN-PLANTERS.

SPECIFICATION forming part of Letters Patent No. 527,160, dated October 9, 1894.

Application filed March 8, 1894. Serial No. 502,861. (No model.)

*To all whom it may concern:*

Be it known that I, LEROY RUNYAN, a citizen of the United States of America, residing at Iola, in the county of Allen and State of Kansas, have invented certain new and useful Improvements in Ridging Attachments for Corn-Planters, of which the following is a specification, reference being had to the accompanying drawings.

This invention relates to certain new and useful improvements in attachments for corn planters, of which the following is such a full, clear and exact description as will enable others skilled in the art to which it appertains to make and use the same.

The object of the invention is to provide an attachment for corn planters that disks properly arranged may serve the purpose of forming ridges above the corn, not only that the corn may be well covered but to further accomplish a result not heretofore obtained, viz: the drainage of the same, it being well known that by the use of the ordinary planters the furrow in which the corn is dropped and covered is lower than the general surface of the soil, thereby making the water drain into the furrows and either rot the corn or cause the surface to become "baked" which obstructs the growth of the shoot.

A further object of the invention is to provide means for readily attaching the device to nearly if not all of the planters in general use; also in making it strong and durable, efficient and satisfactory in use as well as comparatively inexpensive of manufacture.

With these and other objects in view the invention consists in the various novel details of construction, arrangement and combinations of parts to be hereinafter more fully described and specifically pointed out in the claims.

In describing the invention in detail reference is had to the accompanying drawings forming part of this specification and wherein like numerals indicate corresponding parts in both views, in which—

Figure 1, is a longitudinal vertical sectional view of an ordinary corn planter with my attachment in place. Fig. 2, is a top plan view of my device detached.

In the drawings 1, denotes a planter; 2, the frame of the attachment consisting of a transverse bar or axle 3, attached to the cross beam 3ᵃ by means of clips or in any other suitable manner, and rearward extending arms 4, 4, to which the rods 5, 5, are adjustably connected at the joint 6, making the same adjustable to planters of different makes and sizes, said rods diverging into fork-like extremities 7, 7, on which are rotatably mounted disks 8, 8, which being set to move at an angle to the direction of the planter and to one another tend to throw the soil in a ridge as heretofore explained.

The crank shaft 9, connects the disk carrying rods and by vertical links 10, 10, leading therefrom and connecting with lifting rods 11, the frame is elevated or lowered, at the will of the operator; the lever 12, working in the guide 13, provided with a securing pin fitting in apertures equi-distantly arranged that the lever may be held in the adjusted position described.

The advantages of the invention will be apparent and the operation will be understood from the foregoing description, it being particularly noted that various changes may be made in the details of construction without departing materially from the general idea involved.

Having fully described my invention, what I claim as new, and desire to secure by Letters Patent, is—

1. In an attachment for corn planters, the combination with a swinging frame consisting of a cross bar integral with rearwardly extending arms, of diverging extremities secured together and adjustably attached to the said arms, and rotatable disks secured on said extremities as and for the purpose specified.

2. In an attachment for corn planters the combination with a swinging frame consisting of a cross bar integral with rearwardly extending arms, of diverging extremities secured together and adjustably attached to said arms, disks rotatably mounted on the extremities of a crank shaft connecting the arms and a lever operating the crank shaft as and for the purpose specified.

In testimony whereof I affix my signature in presence of two witnesses.

LEROY RUNYAN.

Witnesses:
A. J. SERVEY,
CHRIS. S. RITTER.